United States Patent Office 3,454,630
Patented July 8, 1969

3,454,630
PROCESS FOR THE OXIDATION OF OLEFINS TO ALDEHYDES AND ACIDS
Goichi Yamaguchi and Shigeo Takenaka, Tokyo, Japan, assignors to Nippon Kayaku Company, Ltd., Tokyo, Japan, a corporation of Japan
No Drawing. Filed Sept. 15, 1965, Ser. No. 487,611
Claims priority, application Japan, Oct. 6, 1964, 39/56,644
Int. Cl. C07c 51/32, 45/04
U.S. Cl. 260—533                                7 Claims

ABSTRACT OF THE DISCLOSURE

Unsaturated aldehydes and unsaturated carboxylic acids are prepared by the oxidation of monoolefins such as propylene and isobutylene in the presence of a catalyst such as $Ni_{10}Co_{0.3}FeBiPMo_{12}O_{57}$.

---

This invention relates to the production of useful oxygen-containing substances including unsaturated aldehydes and unsaturated carboxylic acids by the oxidation of olefins such as propylene and isobutylene with molecular oxygen or air in the presence of a novel catalyst corresponding to the empirical formula: $Ni_aCo_bFe_cBi_dP_eMo_fO_g$ wherein $a$ is 0 to 20, $b$ is 0 to 15, $a$ plus $b$ equals 2 to 20, $c$ is 0.1 to 7, $d$ is 0.1 to 4, $e$ is 0.1 to 2, $f$ is about 12 and $g$ is 35 to 85.

According to the present invention the catalyst which is employed in a vapor phase catalytic oxidation reaction increases the total conversion to the desired useful products including unsaturated aldehydes and acids without excessive oxidation of the olefins to undesired higher oxidation products of carbon such as carbon monoxide and carbon dioxide.

The process of this invention will now be considered in more detail in regard to the specific desired products, namely, unsaturated aldehydes and unsaturated corboxylic acids.

In the present specification the following definitions are employed:

$$\text{Conversion percent} = \frac{\text{Mols of olefin converted}}{\text{Mols of olefin fed}} \times 100$$

Selectivity percent =
$$\frac{\text{Mols of aldehyde or acid abtained}}{\text{Mols of olefiin converted}} \times 100$$

Single pass yield percent =
$$\frac{\text{Mols of aldehyde or acid abtained}}{\text{Mols of olefin fed}}$$
$$\times 100 = \text{Conversion} \times \text{Selectivity}$$

UNSATURATED ALDEHYDES

The present invention is particularly effective in the conversion of propylene to acrolein and for this reason the preparation of acrolein from propylene is a preferred embodiment.

One of the main advantages of the process of this invention is the high yield of unsaturated aldehydes prepared from olefins over the catalyst embodied herein. In the case of the oxidation of propylene, for instance, in a representative example, under the proper operating conditions 70% by weight of the propylene fed to the reactor was converted to acrolein, 19% by weight of the propylene was converted to acrylic acid and 2% by weight of the propylene was converted to acetic acid, which amounts to a yield of about 80% of useful products in a single pass of propylene over the catalyst.

The processes for the production of unsaturated aldehydes by the catalytic oxidation of olefins with air or molecular oxygen over the catalyst containing the oxides of bismuth, molybdenum and phosphorus has been previously described in U.S. Patent 2,941,007. The same process carried out over a catalyst comprised of the oxides of iron, bismuth, phosphorus and molybdenum has been previously disclosed in German Patent No. 1,125,901 to Knapsack A. G. Neither of these prior art catalysts contain nickel oxide and cobalt oxide and in this respect the present catalyst compositions are clearly distinguished from those of the prior art.

The inclusion of nickel oxide or cobalt oxide or mixtures thereof in the catalysts embodied herein produces a very high yield of acrolein from propylene. It is apparent that this catalyst is of great commercial value as the following description will indicate.

According to the process of U.S. Patent 2,941,007, 56.9% by weight of propylene fed to the reactor is consumed in a single pass over the catalyst and 71.8% of this propylene consumed is converted to acrolein and most of the remainder of the propylene consumed is converted to carbon monoxide and carbon dioxide. The highest single pass yield of acrolein based on the total propylene fed in the U.S. Patent 2,941,007 is 41%.

In the process of German Patent No. 1,125,901, 70% of the propylene fed in a single pass over the catalyst is consumed and of this 84% is converted to acrolein. Thus, an overall single pass conversion of propylene to acrolein of 59% is described in the German patent.

In vapor phase catalytic reactions it is generally found that as conversion of the reactants is increased there is a decrease in selectivity so that in the prior art vapor phase oxidation of propylene to acrolein, the single pass conversion to acrolein is usually not very high.

In marked contrast to the prior art processes, in a representative example in the present invention, 95% of the propylene fed in a single pass over the catalyst is consumed and 75% of the propylene consumed is converted to acrolein. Thus, an overall conversion of propylene to acrolein of 71% is obtained in a single pass in the process of this invention. This is indeed unobvious and unexpected in view of the prior art.

When vapor phase catalytic oxidation reactions of the type embodied herein are carried out beyond the point where the total conversion is specific to the catalyst, the production of undesired carbon monoxide and carbon dioxide usually increases and the overall yield of the desired product, such as acrolein, decreases correspondingly.

In the process of the present invention the production of carbon monoxide and carbon dioxide is minimal and usually only about 2% is converted to carbon monoxide and only about 5% is converted to carbon dioxide while the total conversion of propylene is about 95%. This is indeed an unexpected result and its is a very desirable advantage from a commercial standpoint.

In the prior art processes it is necessary to recycle unreacted propylene in order to achieve as high yields of acrolein as those obtained in a single pass in the present invention. In the prior art processes when the unreacted propylene is separated from the reactor effluent which has been passed over the catalyst once and is fed back to the raw propylene feed, the ultimate conversion increases and therefore the yield of acrolein based on the propylene fed increases. When carried out on a commercial scale, it is clear that the process of the present invention, which produces a very high single pass conversion of the propylene and a high yield of acrolein, does not require the recovery and recycle of propylene. Thus, the present process has a decided advantage over the prior art processes in plant construction and operation costs.

UNSATURATED CARBOXYLIC ACIDS

Furthermore the present invention has special application to the production of unsautrated aliphatic acids such as acrylic acid by the oxidation of propylene with oxygen. Under the proper conditions, extremely high yields of unsaturated aliphatic acids can be obtained directly by the oxidation of olefins.

In one instance, for example, according to the present process, propylene was oxidized at a temperature of 360° C. to produce a 45% yield of acrylic acid based on propylene fed along with a 17% yield of acrolein. Thus a total yield of useful products of about 60% was obtained in this experiment. Upon removal of the acrylic acid from the reactor effluent and recycling acrolein back to the reactor, the yield of acrylic acid becomes greater than 50%.

Many previous attempts have been made to oxidize olefins with molecular oxygen or air directly to unsaturated acids. In all the prior attempts, however, both the conversion and selectivity have been about 50%, and thus in the best attempts to oxidize propylene to acrolein, a yield of about 20% was obtained. If the conversion was increased, excessive oxidation of the propylene to carbon monoxide and carbon dioxide increased and the single pass yield of acrylic acid decreased. Generally speaking, in a vapor phase catalytic oxidation, as the conversion of the feed is increased, the selectivity of desired product decreases and thus a high single pass yield of acrylic acid from propylene has not heretofore been achieved as has been mentioned above.

According to a representative example of the process of this invention, when the single pass conversion of propylene is brought to more than 90% under the proper conditions, the selectivity to acrylic acid and acrolein amounts to about 60% overall and the yield of acrylic acid usually is about 50%. This is indeed unexpected and is highly advantageous from a commercial standpoint.

The present process for preparing unsaturated carboxylic acids such as acrylic acid is advantageous over the prior art two-step production of acrylic acid via acrolein as an intermediate. The plant investment in a commercial operation is considerably less for the present single-step process for converting propylene to acrylic acid and heretofore the best yields of acrylic acid by the two-step method employing acrolein as an intermediate have been only about 20% based on the original feed.

CATALYST

The catalyst useful in the process of the present invention is the homogeneous mixture, compound or possibly a complex of some unknown physical or chemical nature made up of the oxides of iron, bismuth, phosphorus, and molybdenum, and furthermore nickel oxide or cobalt oxide. The composition is conveniently expressed in the following empirical formula:

$$Ni_aCo_bFe_cBi_dP_eMo_fO_g$$

wherein $a$ is 0 to 20, $b$ is 0 to 15, $a$ plus $b$ equals 2 to 20, $c$ is 0.1 to 7, $d$ is 0.1 to 4, $e$ is 0.1 to 2, $f$ is about 12 and $g$ is 35 to 85.

In particular, the preferred catalysts of this invention can be expressed in the following three empirical formulae:

$$Ni_aFe_bBi_cP_dMo_eO_f$$

wherein $a$ is 3 to 14, $b$ is 1 to 3, $c$ is 1 to 3, $d$ is about 1, $e$ is 12 and $f$ is 45 to 70;

$$Co_aFe_bBi_cP_dMo_eO_f$$

wherein $a$ is 2 to 7, $b$ is 1 to 3, $c$ is 1 to 3, $d$ is about 1, $e$ is 12 and $f$ is 45 to 70; and $$Ni_aCo_bFe_cBi_dP_eMo_fO_g$$

wherein $a$ is smaller than 14, $b$ is smaller than 7, $a$ plus $b$ equals 2 to 20, $a$ and $b$ is not zero, respectively, $c$ is 1 to 3, $d$ is 1 to 3, $e$ is about 1, $f$ is 12 and $g$ is 45 to 70.

The first preferred catalyst mentioned above can also be expressed as a composition containing the following components:

| | Mole percent |
|---|---|
| Nickel phosphomolybdate | 20–99.8 |
| Iron phosphomolybdate | 0.1–40 |
| Bismuth phosphomolybdate | 0.1–40 | and the more preferred catalyst of this type has the following composition:

| | Mole percent |
|---|---|
| Nickel phosphomolybdate | 80–90 |
| Iron phosphomolybdate | 5–10 |
| Bismuth phosphomolybdate | 5–10 |

The catalyst of this invention is usually prepared by adding phosphoric acid to an aqueous solution of the suitable molybdenum compound such as ammonium molybdate, and then an aqueous solution of a water-soluble iron salt and bismuth salt and furthermore nickel salt, cobalt salt or the mixture thereof is added to the phosphomolybdic acid solution. This preparation, however, may be varied as one likes. For example, an aqueous solution of the suitable molybdenum compound is added to an aqueous solution of a water-soluble salt and then phosphoric acid is added. The resulting slurry is then heated with a carrier, if desired, to remove water and dry the solid cake which forms. The solid cake is then calcined at an elevated temperature in the air. This calcination is useful for making the specific surface area of the catalyst proper and increasing the selectivity.

Suitable water-soluble salts for the preparation of the catalysts of this invention are nickel nitrate, cobalt nitrate, ferric nitrate and bismuth nitrate, for instance. In special cases, agents which form these water-soluble salts, such as the mixture of metal and acid or of metal oxide and acid may be used in place of water-soluble salts. Molybdenum oxide, molybdic acid or phosphomolybdic acid may suitably be used in place of ammonium molybdate.

The catalyst embodied herein is particularly effective when deposited upon a carrier. Suitably carriers include silica, silicon carbide and alumina. The carrier may be added as a sol or a gel to the phosphomolybdate slurry before the slurry is dried. The catalyst is useful in many solid physical forms such as grains and pellets. The catalyst of this invention is suitable for use in a fixed bed reactor or in a fluidized bed reactor.

THE PROCESS CONDITIONS

The catalytic oxidation process of this invention is carried out at a temperature of from 250 to 450° C. and at a pressure of from 0.5 to 10 atmospheres absolute, and preferably at a temperature of from 300 to 450° C. at atmosperic pressure. In general, the yield of unsaturated carboxylic acid is favored in the higher reaction temperature ranges, higher ratios of oxygen to olefin and longer contact times and the converse is true of the yields of unsaturated aldehyde.

In the oxidation of propylene by the instant process the contact time of the mixture of propylene and air with the catalyst is usually from 0.1 to 12 seconds and preferably from 0.5 to 8 seconds at one atmosphere pressure.

The feed for the process embodied herein usually requires the presence of from 0.5 to 5 mols of oxygen per mol of propylene. Stated somewhat differently, the preferred mol ratios of ingredients in the gaseous feed mixture are from 4 to 10 moles of air per mol of propylene.

It is preferred that water in the form of steam is fed to the reactor along with the gaseous mixture of propylene and air. A large volume of water in the feed effects a dilution and removal of reaction heat, but water need not be employed if the reaction heat can efficiently be removed. The mole ratio of water per mole of propylene may be in the range of 1 to 20, but a ratio of 5 to 10 is preferred. The feed gas in the instant process may contain saturated hydrocarbons such as ethane, propane, etc., because they are inert and do not effect the oxidation of the olefins.

In general, air is used as the source of molecular oxygen in the instant process; however, molecular oxygen, per se, or mixtures of oxygen and inert gases such as nitrogen, carbon dioxide, etc., may also be used.

Since the reaction is exothermic, the temperature within the reactor must be regulated in order to control the reaction. So it is preferred that the reactor be placed in a fluidized solids bath, a salt bath such as a molten potassium nitrate bath, or a metal bath such as a tin bath.

As mentioned above, the yield of acrolein and acrylic acid by the oxidation process of this invention is extremely high, but undesired oxidation products such as carbon monoxide and carbon dioxide are produced in minimal amounts.

The process of the present invention is further illustrated by the following examples.

EXAMPLE 1

(A) 163 grams of nickel nitrate were dissolved in 80 ml. of distilled water; 21.6 grams of ferric nitrate were dissolved in 12 ml. of distilled water; 25.0 grams of bismuth nitrate were dissolved in 18 ml. of distilled water containing 2.4 ml. of concentrated nitric acid and all of the foregoing solutions were combined.

(B) 113.6 grams of ammonium molybdate were dissolved in 140 ml. of distilled water and 6.32 g. of 85% phosphoric acid were then added.

Solution B, which was pale yellow in color, was added to solution A and to the resulting slurry were added 34.2 grams of silica in the form of an aqueous sol. The resulting slurry was dried and heated at 400° C. in air. The cooled mass was pulverized, the power was pelleted and then calcined at 500° C. for six hours. The catalyst was found to have the following empirical formula:

$$Ni_{10.5}Fe_1Bi_1P_1Mo_{12}O_{57}$$

EXAMPLES 2–17

Table 1 shows some variations of the manufacturing procedure and the compositions of catalyst in Example 1, and the procedure is carried out in the same way as that of Example 1 except for the variation in conditions shown in Table 1.

TABLE 1

| Ex. No. | Nickel nitrate (grams) | Cobalt nitrate (grams) | Ferric nitrate (grams) | Bismuth nitrate (grams) | Ammonium molybdate (grams) | Phosphoric acid, 85% (grams) | Carrier SiO(g.)$_2$ | Empirical formula of catalyst |
|---|---|---|---|---|---|---|---|---|
| 2 | 155.0 | 4.6 | 21.6 | 25.0 | 113.6 | 6.3 | 40.0 | $Ni_{10}Co_{0.3}Fe_1Bi_1P_1Mo_{12}O_{51}$ |
| 3 | 155.0 | 4.6 | 21.6 | 25.0 | 113.6 | 1.26 | 40.0 | $Ni_{10}Co_{0.3}Fe_1Bi_1P_{0.2}Mo_{12}O_{53}$ |
| 4 | 155.0 | 4.6 | 21.6 | 25.0 | 113.6 | 6.3 | 40.0 | $Ni_{10}Co_{0.3}Fe_1Bi_1P_1Mo_{12}O_{57}$ |
| 5 | 155.0 | 4.6 | 21.6 | 25.0 | 113.6 | 3.15 | 40.0 | $Ni_{10}Co_{0.3}Fe_1Bi_1P_{0.5}Mo_{12}O_{54}$ |
| 6 | 105.0 | 96.8 | 32.4 | 37.6 | 170.0 | 9.0 | 60.0 | $Ni_{4.5}Co_4Fe_1Bi_1P_1Mo_{12}O_{54}$ |
| 7 | 163.0 | 12.2 | 64.8 | 75.2 | 170.0 | 9.0 | 60.0 | $Ni_7Co_{0.5}Fe_2Bi_2P_1Mo_{12}O_{54}$ |
| 8 | 163.0 | 48.4 | 32.6 | 37.6 | 170.0 | 9.0 | 60.0 | $Ni_7Co_2Fe_1Bi_1P_1Mo_{12}O_{54}$ |
| 9 | 163.0 | | 21.6 | 25.0 | 113.6 | 3.16 | 34.2 | $Ni_{10.5}Fe_1Bi_1P_{0.5}Mo_{12}O_{56}$ |
| 10 | 163.0 | | 21.6 | 25.0 | 113.6 | 9.48 | 34.2 | $Ni_{10.5}Fe_1Bi_1P_{1.5}Mo_{12}O_{58}$ |
| 11 | 106.0 | | 43.2 | 50.0 | 113.6 | 6.32 | 40.0 | $Ni_{7.5}Fe_2B_{12}P_1Mo_{12}O_{55}$ |
| 12 | 70.0 | | 65.8 | 75.0 | 113.6 | 5.10 | 60.0 | $Ni_{4.5}Fe_3Bi_3P_{0.9}Mo_{12}O_{53}$ |
| 13 | 186.0 | | 28.0 | 17.4 | 113.6 | 6.32 | 60.0 | $Ni_{12}Fe_{1.3}Bi_{0.7}P_1Mo_{12}O_{59}$ |
| 14 | 190.0 | | 21.6 | 25.0 | 113.6 | 6.32 | 40.0 | $Ni_{14}Fe_1Bi_1P_1Mo_{12}O_{60}$ |
| 15 | 163.0 | | 10.8 | 37.5 | 113.6 | 6.32 | 40.0 | $Ni_{10.5}Fe_{0.5}Bi_{1.5}P_1Mo_{12}O_{57}$ |
| 16 | | 145.0 | 32.4 | 37.6 | 170.0 | 9.00 | 60.0 | $Co_6Fe_1Bi_1P_1Mo_{12}O_{50}$ |
| 17 | | 108.7 | 48.6 | 56.4 | 170.0 | 9.00 | 60.0 | $Co_{4.5}Fe_{1.5}Bi_{1.5}P_1Mo_{12}O_{49}$ |

EXAMPLE 18

140 ml. of the catalyst of the empirical formula $$Ni_{10.5}Fe_1Bi_1P_1Mo_{12}O_{57}$$

were placed in a reactor 20 mm. in diameter dipped in a molten potassium nitrate bath maintained at about 310° C.

A gaseous mixture composed as follows was passed over the catalyst at atmospheric pressure:

| | Mol ratios |
|---|---|
| Propylene | 1 |
| Air | 10 |
| Steam | 6 |

The apparent contact time was 2 seconds.

The conversion, single pass yields and selectivities of products by this reaction are as follows:

| | Percent |
|---|---|
| Conversion | 98 |
| Selectivity of acrolein | 72 |
| One pass yield of acrolein | 71 |
| Selectivity of acrylic acid | 19.8 |
| Single pass yield of acrylic acid | 19.4 |

EXAMPLES 19–40

Table 2 shows some variations of the oxidation process of Example 18 and the procedure is carried out in the same way as that of Example 18 except for the variation in conditions shown in Table 2.

TABLE 2

| Example No. | Catalyst composition | Reaction conditions | | Feed composition (mol ratio) | | | Conversion, percent | Selectivity, percent | | Single pass yield (percent) | |
|---|---|---|---|---|---|---|---|---|---|---|---|
| | | Contact time (sec.) | Bath temp. (° C.) | Propylene | Air | Steam | | Acrolein | Acrylic acid | Acrolein | Acrylic acid |
| 19 | $Ni_{10.5}Fe_1Bi_1P_1Mo_{12}O_{57}$ | 2.0 | 300 | 1 | 10 | 6 | 98 | 72 | 19.8 | 71 | 19.4 |
| 20 | $Ni_{10.5}Fe_1Bi_1P_{0.5}Mo_{12}O_{55}$ | 2.0 | 300 | 1 | 10 | 6 | 89 | 73.5 | 13.5 | 65.3 | 12.0 |
| 21 | $Ni_{10.5}Fe_1Bi_1P_{1.5}Mo_{12}O_{58}$ | 2.0 | 200 | 1 | 10 | 6 | 84 | 64.7 | 10.2 | 54.4 | 8.5 |
| 22 | $Ni_{7.5}Fe_2B_{12}P_1Mo_{12}O_{55}$ | 3.0 | 310 | 1 | 10 | 6 | 95 | 68.5 | 8.2 | 65.0 | 7.8 |
| 23 | $Ni_{4.5}Fe_3Bi_3P_{0.8}Mo_{12}O_{53}$ | 3.5 | 320 | 1 | 10 | 6 | 92 | 76.6 | 5.1 | 70.5 | 4.5 |
| 24 | $Ni_{12}Fe_{1.3}Bi_{0.7}P_1Mo_{12}O_{58}$ | 8.0 | 370 | 1 | 12 | 6 | 100 | 15.4 | 46.3 | 15.4 | 46.3 |
| 25 | $Ni_{14}Fe_1Bi_1P_1Mo_{12}O_{60}$ | 4.1 | 345 | 1 | 11.4 | 6 | 74.5 | 78 | 8.4 | 58 | 6.3 |
| 26 | $Ni_{10}Fe_{0.5}Bi_{1.5}P_1Mo_{12}O_{57}$ | 5.4 | 320 | 1 | 7.2 | 6 | 84.8 | 78 | 10.8 | 66 | 9.2 |
| 27 | $Ni_{10.5}Fe_1Bi_1P_1Mo_{12}O_{57}$ | 0.7 | 360 | 1 | 9 | 6 | 89.1 | 60.5 | 24.6 | 53.9 | 21.9 |
| 28 | $Ni_{10.5}Fe_1Bi_2P_1Mo_{12}O_{57}$ | 1 | 320 | 1 | 9 | 4 | 89.4 | 73.5 | 16.3 | 65.4 | 14.4 |
| 29 | $Ni_{10}Co_{0.3}Fe_1Bi_1P_1Mo_{12}O_{51}$ | 4.6 | 310 | 1 | 8 | 5 | 95 | 75 | 14.7 | 71.0 | 14.0 |
| 30 | $Ni_{10}Co_{0.3}Fe_1Bi_1P_{0.5}Mo_{12}O_{54}$ | 3.5 | 315 | 1 | 8 | 5 | 97 | 72 | 15.0 | 70.0 | 14.5 |
| 31 | $Ni_{10}Co_{0.3}Fe_1Bi_1P_{0.2}Mo_{12}O_{53}$ | 3.4 | 330 | 1 | 8 | 5 | 83 | 73 | 96.0 | 61.0 | 8.0 |
| 32 | $Ni_{4.5}Co_4Fe_1Bi_1P_1Mo_{12}O_{52}$ | 3.2 | 350 | 1 | 8 | 5 | 95 | 74 | 18.0 | 70.0 | 15.0 |
| 33 | $Ni_{10}Co_{0.3}Fe_1Bi_1P_1Mo_{12}O_{57}$ | 8 | 330 | 1 | 10 | 6 | 97 | 17.4 | 44.5 | 16.9 | 43.2 |
| 34 | $Ni_{10}Co_{0.3}Fe_1Bi_1P_{0.5}Mo_{12}O_{54}$ | 9 | 340 | 1 | 10 | 6 | 83 | 21.7 | 47.0 | 18.0 | 39.0 |
| 35 | $Ni_{4.5}Co_4Fe_1BiP_1Mo_{12}O_{54}$ | 9 | 340 | 1 | 12 | 6 | 95 | 20.3 | 44.0 | 19.3 | 41.5 |
| 36 | $Ni_7Co_{0.5}Fe_2Bi_2P_1Mo_{12}O_{54}$ | 7.5 | 350 | 1 | 10 | 6 | 89.8 | 76 | 15 | 68.0 | 13.5 |
| 37 | $Ni_7Co_2Fe_1Bi_1P_1Mo_{12}O_{53}$ | 7.2 | 365 | 1 | 10 | 6 | 98.0 | 46 | 27.6 | 45.0 | 27.0 |
| 38 | $Co_6Fe_1Bi_1P_1Mo_{12}O_{50}$ | 3.3 | 330 | 1 | 8 | 5 | 98 | 72 | 16.7 | 70.5 | 16.5 |
| 39 | $Co_6Fe_1Bi_1P_1Mo_{12}O_{50}$ | 5 | 350 | 1 | 12 | 6 | 90 | 20 | 42.2 | 18.0 | 38 |
| 40 | $Co_{4.5}Fe_{1.5}Bi_{1.5}P_1Mo_{12}O_{48}$ | 8 | 335 | 1 | 10 | 6 | 91.6 | 71 | 20.2 | 65.0 | 18.6 |

EXAMPLE 41

140 ml. of the catalyst of the empirical formula $$Ni_{10}Co_{0.3}Fe_1Bi_1P_1Mo_{12}O_{51}$$

were placed in a reactor 20 mm. in diameter immersed in a molten potassium nitrate bath maintained at about 290° C.

A gaseous mixture composed as follows was passed over the catalyst at atmospheric pressure:

|  | Mol ratios |
|---|---|
| Isobutylene | 1 |
| Air | 11 |
| Steam | 6 |

The apparent contact time was 8.6 seconds.

The conversion, single pass yields and selectivities of products by this reactions are as follows:

|  | Percent |
|---|---|
| Conversion | 96 |
| Selectivity of methacrolein | 37 |
| Single pass yield of methacrolein | 35 |
| Single pass yield of methacrylic acid | 20 |
| Selectivity of methacrylic acid | 21 |

EXAMPLES 42–44

Table 3 shows some variations of the oxidation process of Example 41 and the procedure is carried out in the same way as that of Example 41 except for the variation in conditions shown in Table 3.

We claim:

1. The process for oxidizing olefins to unsaturated aldehydes and unsaturated carboxylic acids comprising reacting in vapor phase at a temperature of from 250 to 450° C., at a pressure of from 0.5 to 10 atmospheres absolute, an olefin selected from the group consisting of propylene and isobutylene with a gas selected from the group consisting of air, oxygen and mixtures thereof in the presence of an oxidation catalyst of the empirical formula $$Ni_aCo_bFe_cBi_dP_eMo_fO_g$$

wherein $a$ is 0 to 20, $b$ is 0 to 15, $a$ plus $b$ equals 2 to 20, $c$ is 0.1 to 7, $d$ is 0.1 to 4, $e$ is 0.1 to 2, $f$ is about 12 and $g$ is 35 to 85.

2. The process of claim 1 wherein the reaction is carried out in the presence of steam.

3. The process of claim 2 wherein the contact time is from 0.1 to 20 seconds.

4. The process of claim 3 wherein the reaction is carried out at a temperature of from 300 to 450° C.

5. The process of claim 4 wherein the olefin is propylene.

6. The process of claim 4 wherein the olefin is isobutylene.

7. The process of claim 5 wherein the mol ratios oxygen, steam and olefin are 0.5–8:1–20:1, respectively.

TABLE 3

| Ex. No. | Catalyst composition | Reaction conditions | | Feed composition (mol ratio) | | | Conversion, percent | Selectivity (percent) | | Single pass yield (percent) | |
|---|---|---|---|---|---|---|---|---|---|---|---|
|  |  | Contact time (sec.) | Bath temp. (° C.) | Isobutylene | Air | Steam |  | Methacrolein | Methacrylic acid | Methacrolein | Methacrylic acid |
| 42 | $Ni_{12}Fe_{1.3}Bi_{0.7}P_1Mo_{12}O_{58}$ | 12.0 | 300 | 1 | 18 | 8 | 100 | 4.8 | 32 | 4.8 | 32.0 |
| 43 | $Ni_{10.5}Fe_1Bi_1P_1Mo_{12}O_{57}$ | 4.0 | 270 | 1 | 15 | 10 | 96 | 37 | 10 | 35.0 | 9.5 |
| 44 | $Ni_{10}Co_{0.3}Fe_1Bi_1P_1Mo_{12}O_{57}$ | 10.0 | 330 | 1 | 15 | 8 | 80 | 15.2 | 40.7 | 12.1 | 32.5 |

References Cited

UNITED STATES PATENTS

| 3,171,859 | 3/1965 | Sennewald et al. | 260—604 |
| 3,177,257 | 4/1965 | Detling et al. | 260—604 |

FOREIGN PATENTS

| 971,666 | 9/1964 | Great Britain. |
| 948,687 | 2/1964 | Great Britain. |

LORRAINE A. WEINBERGER, *Primary Examiner.*

D. STENZEL, *Assistant Examiner.*

U.S. Cl. X.R.

252—437; 260—604

UNITED STATES PATENT OFFICE
CERTIFICATE OF CORRECTION

Patent No. 3,454,630                                         July 8, 1969

Goichi Yamaguchi et al.

It is certified that error appears in the above identified patent and that said Letters Patent are hereby corrected as shown below:

Column 1, line 39, "corboxy-" should read -- carboxy- --; line 48, "abtained" should read -- obtained --; line 52, "abtaine should read -- obtained --. Column 2, line 55, "its" should read -- it --. Column 3, line 3, "unsautrated" should read -- unsatura --. Column 4, line 42, "Suitably" should read -- Suitable --; lin 45, "slurry" should read -- catalyst --; line 55, "atmosperic" should read -- atmospheric --. Column 5, line 53, "power" should read -- powder --. Column 6, Table I, eighth column heading, "Carrier SiO(g.)$_2$" should read -- Carrier SiO$_2$ (g.) --; Table I, Example 5, last column, "N$_{10}$" should read -- Ni$_{10}$ --; Example 12, last column, "P$_{0.9}$" should read -- P$_{0.8}$ --; same Table I, Examp 13, last column, "0$_{59}$" should read -- 0$_{58}$ --; Table II, Example 21, third column, "200" should read -- 300 --; Example 35, first column, "Bi" should read -- Bi$_1$ --; Example 39, second column, "5" should read -- 9 --; same column 6, Table II, Example 40, first column, "0$_{48}$" should read -- 0$_{49}$ --. Column 7, line 17, "reactions" should read -- reaction --.

Signed and sealed this 16th day of February 1971.

(SEAL)
Attest:

EDWARD M. FLETCHER, JR.                              WILLIAM E. SCHUYLER, JR.
Attesting Officer                                             Commissioner of Patents